United States Patent [19]

Keromnes et al.

[11] Patent Number: 5,199,380
[45] Date of Patent: Apr. 6, 1993

[54] SYSTEM FOR SEPARATING NEWLY HATCHED CHICKS FROM HATCHING DEBRIS

[75] Inventors: Bernard Keromnes, Plourin les Morlaix; Jean-Pierre Breuil, Locquenole, both of France

[73] Assignee: Breuil Societe Anonyme, Landivisiau Cedex, France

[21] Appl. No.: 878,227

[22] Filed: May 4, 1992

[30] Foreign Application Priority Data

Dec. 2, 1991 [FR] France .................. 91 14894

[51] Int. Cl.$^5$ .................. A01K 43/00; A01K 45/00
[52] U.S. Cl. .................. 119/22; 209/538; 209/665; 198/418.5; 198/418.6; 414/403; 119/44
[58] Field of Search .................. 119/174, 43, 44, 21, 119/22, 155; 209/538, 665, 919, 510; 414/403, 419; 198/418.5, 418.6

[56] References Cited

U.S. PATENT DOCUMENTS

| 3,704,688 | 12/1972 | Wilson | 119/22 |
| 4,023,531 | 5/1977 | Thompson | 119/22 |
| 4,191,130 | 3/1980 | Musgrave | 119/22 |
| 4,923,737 | 4/1989 | Nakajiwa et al. | 119/22 |

FOREIGN PATENT DOCUMENTS

| 888889 | 12/1981 | U.S.S.R. | 119/22 |
| 1042717 | 9/1983 | U.S.S.R. | 119/43 |

Primary Examiner—John G. Weiss
Attorney, Agent, or Firm—Sandler, Greenblum & Bernstein

[57] ABSTRACT

System for separating newly hatched chicks from hatching debris is provided with comprising at least one movable belt constituted of rollers arranged parallel with respect to each other, but perpendicularly with respect to their direction of displacement, and above which the chicks and the debris to be sorted are brought, with the chicks being adapted to pass between the rollers. There is further included at least one support arm which is rotationally mounted above the belt about an axis substantially parallel to the rollers of the movable belt, and that comprises means for maintaining at least one basket in which the chicks and debris to be sorted are placed.

20 Claims, 2 Drawing Sheets

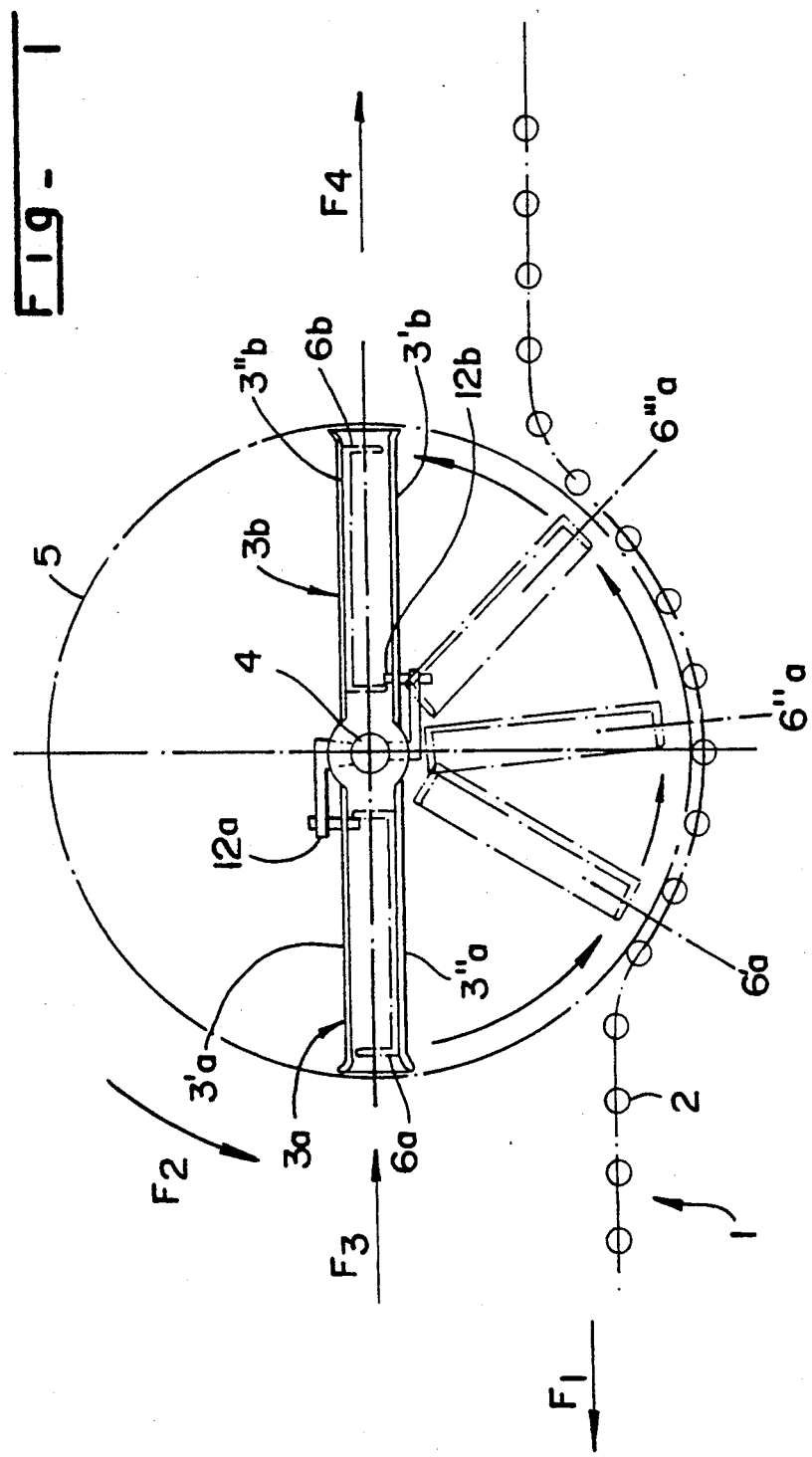

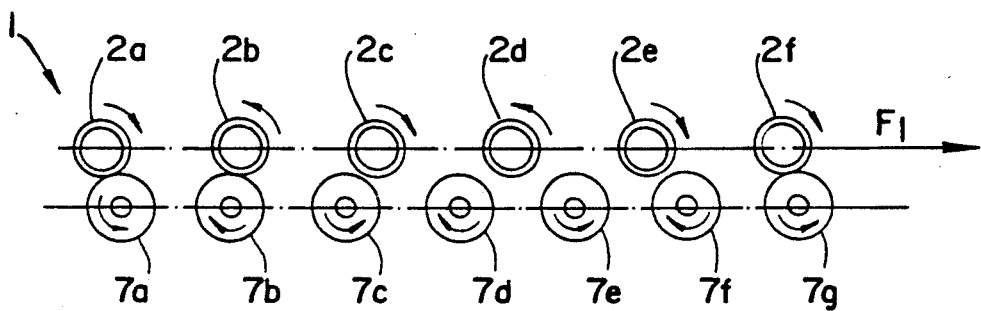
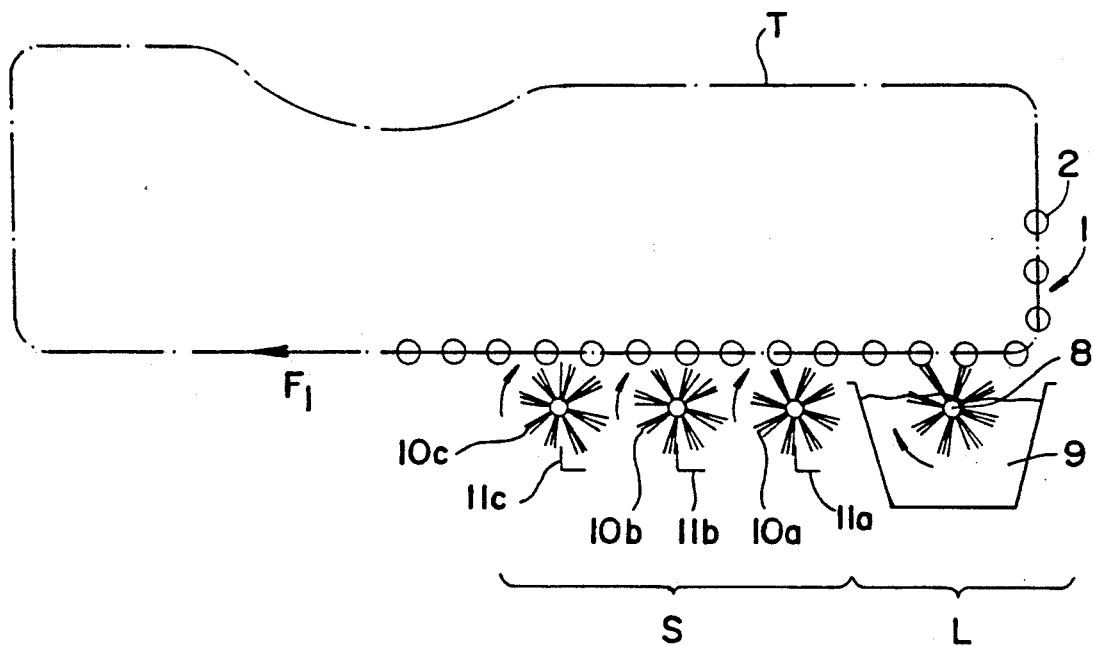

SYSTEM FOR SEPARATING NEWLY HATCHED CHICKS FROM HATCHING DEBRIS

BACKGROUND OF THE INVENTION

1. Field of the Invention

The present invention involves a system for separating newly hatched chicks from hatching debris.

2. Discussion of Background Information

In order to hatch chicks, eggs are placed in baskets on the eighteenth day of incubation. These baskets are stacked and are placed in a hatchery where the chicks hatch on the twenty-first day of incubation.

After incubation, these baskets contain (a) chicks, (b) transparent eggs (non-fertilized), (c) non-hatched eggs (dead embryos), (d) large pieces of empty shell which comprise approximately three-quarters of a complete shell, (e) average sized pieces, hereinafter called "hats," which comprise approximately one quarter of a complete shell, and (f) a large number of small pieces of shell.

One conventional technique for removing chicks consisted of sorting them manually from among all the debris. However, various systems have been conceived in order to try to automatically separate chicks from the debris.

One of these systems consists of placing the contents of the hatching baskets on a movable separating belt formed of cylindrical rollers. The chicks as well as the "hats" and the small shells pass through the bars of the separating belt, which retain the large shells, the transparent eggs and the non-hatched eggs. A recovery belt is provided beneath the separating belt. The recovery belt is also equipped with bars; however, the spacing of these bars is smaller than those of the separating belt in order to retain the chicks and the "hats," while permitting the smaller shells pass through.

From the recovery belt, the chicks and the "hats" are conveyed towards a ventilation system formed of a lower blower and an upper suction device, whereby the "hats" are sucked away while the chicks are left behind.

The major problem of such the above-described system resides in the fact that the number of transparent eggs increases proportionately with an increasing number of aging laying hens. Moreover, these transparent eggs have an increased fragility, because their shells become increasingly thinner. The breakage of such eggs causes the deposition of egg yolks on the rollers, whereby the rollers become encrusted so that passing of the chicks therethrough is impeded.

In view of the above problems, there has been made an attempt to invert the baskets on a flexible belt. This is also the reason why automatic sorter ovoscopes have been perfected for automatically sorting eggs, while separating transparent eggs as much as possible. However, using an ovoscope technique requires a longer period of time and is more expensive, unless the transparent eggs are put to some good use, such as food for pigs or cows.

In order to overcome these disadvantages, the present inventors envisioned a system that would be capable of minimizing the breakage of transparent eggs, and at the same time, would correctly stack the chicks. In particular, it was desired to obtain a technique wherein the chicks would be forced between rollers, and the rollers would be washed, disinfected and dried, thereby preventing the rollers becoming dirty to ensure the sliding of chicks therethrough.

Up until now, as has been discussed above, one technique consisted of inverting the baskets on a flexible belt, and then conveying the contents towards the rollers. It was also envisioned inverting the baskets in a hopper above the rollers, and then letting the contents of the hopper fall on the rollers. However, in both these techniques there was a lot of breakage.

SUMMARY OF THE INVENTION

It is an object of the present invention to overcome the disadvantages associated with known systems for separating newly hatched chicks from hatching debris.

To achieve this object, the present invention provides a system comprising at least one movable belt formed of rollers arranged parallel with respect to one another, but perpendicularly to the direction of displacement of the at least one movable belt, and above which the chicks as well as the debris to be sorted are brought. The chicks are capable of passing between the rollers. The system further includes at least one support arm which is rotationally mounted above the at least one movable belt about an axis substantially parallel to the rollers of the at least one movable belt, and further including means to maintain at least one basket in which the chicks and the debris to be sorted are placed.

Consequently, it is an object of the present invention to rotate the baskets directly above the rollers of the movable belt.

Advantageously, the rotational movement of the arm is in the opposite direction with respect to the displacement of the movable belt, in its lower semi-circular trajectory.

Preferably, the roller belt has, just beneath the rotating arm, a partially cylindrical and concave trajectory surface, whose axis of curvature is co-axial with respect to the rotational axis of the rotating arm. The latter is also arranged above the general plane of the belt, at a distance smaller than the length of the rotating arm, such that the partially cylindrical and concave trajectory surface is substantially parallel and next to the surface described by the external edge of the arm and/or the basket.

One preferred embodiment comprises at least two diametrically opposed arms adapted to receive at least two baskets, such that a full basket can be loaded on one side, and at the same time, an empty basket can be unloaded from the other side, with the unloading of the basket being done, for example, by means of a gripping bucket. During this time, the belt is displaced and removes everything from beneath the arms, such that a new cycle can start.

It is also an object of the present invention to provide means to drive the rollers in one direction and then in the other. According to one embodiment, the rollers of the belt are mounted freely in rotation, with these rollers passing above a series of rotationally driven rollers placed beneath at least one portion of the movable belt, such that each roller, during its path, is temporarily driven in rotation by each driven roller.

Preferably, two successive rollers are driven in inverse rotation in such a way that the rollers change their rotational direction at each contact with a driven roller. This continuous change in rotation unbalances the chicks and forces them to pass between the rollers, especially if they turn in opposite directions towards the inside.

According to one embodiment, the spacing of the driven rollers is less than that of the rollers, such that for a given length of belt, there are more driven rollers than rollers, and consequently, two successive rollers can turn, by contact or by inertia, in the opposite direction downwardly, or in the opposite direction upwardly, or yet again, in the same direction.

In still another embodiment of the present invention, the movable belt describes a path having closed surface, and a cleaning and drying device is arranged at at least one portion of the path for contacting the rollers of the movable belt. The cleaning and drying device comprises at least one rotating washing brush combined with a washing vat, filled with a heated liquid, in which the rotating washing brush is dipped at least partially during its rotation, and at least one rotating brush for drying or wiping combined with at least one drainage projection that it hits against during its rotation. The at least one drying or wiping brush is placed downstream from the at least one washing brush with respect to the direction of movement of the belt. Preferably, the washing and wiping brushes turn in opposite directions with respect to the direction of movement of the belt at their point of contact with the rollers.

BRIEF DESCRIPTION OF THE DRAWINGS

The invention will be better understood and other special characteristics will become clearer upon reading the description that follows, with reference to the annexed drawings, in which:

FIG. 1 shows a schematic view of a basket upturning device according to the invention, FIG. 2 partially represents a roller belt and its driving means in rotation according to the invention, FIG. 3 shows a schematic view of the cleaning and drying means of the roller belt according to the invention.

DETAILED DESCRIPTION OF THE PREFERRED EMBODIMENTS

In FIG. 1, one can partially see belt 1 of rollers such as 2, that are arranged in parallel with respect to one another, and are displaced along arrow F1, i.e., perpendicularly with respect to their own longitudinal positioning.

The upturning device according to the invention comprises two arms 3a and 3b, that are diametrically opposed, and that are mounted such they are able to pivot about an axis 4 arranged above the belt 1, parallel to rollers 2. The rotation of the arms is done along arrow F2, that is, in the opposite direction with respect to the movement F1 of the belt when considering its lower semi-circular trajectory.

As can be clearly seen from FIG. 1, belt 1 has, beneath its arms 3a and 3b, a trajectory surface that is partially cylindrical and concave such that the displacement surface of the ends of arms 3a and 3b, represented in dotted and dashed lines by reference numeral 5, are next to and parallel to the trajectory surface of the belt in this zone.

All that is required for this is that the axis of curvature of the belt trajectory substantially coincide with the rotational axis 4 of the arms. Moreover, axis 4 is arranged above the general plane of the belt at a smaller distance than the length of each arm.

The arms 3a and 3b comprise means such as slides 3'a, 3"a and 3'b, 3"b adapted to receive the baskets.

Retention means, are clearly provided to retain the baskets, such as retractable wedges 12a, 12b.

6a and 6b represent baskets placed in respective arms 3a and 3b.

When the arms 3a and 3b are substantially horizontal, as is represented in FIG. 1, it is easy to fix a basket 6a in the arm 3a along arrow F3, in the same way that it is possible to remove, along arrow F4, basket 6b from arm 3b, for example, by means of an element such as a bucket or a similar device provided for this purpose.

It is also understood that basket 6a (arm 3a being towards the front with respect to the displacement of belt 1) is full and is fixed in such a way that its opening is on top whereas basket 6b is completely inverted and, on the contrary, is open towards the base.

Indeed, some intermediate positions have been schematically represented 6'a, 6"a, 6'''a in which basket 6a is shown in various positions before it acquires the position of current basket 6b.

It is understood that during its lower trajectory, the basket is upturned completely and can empty its contents.

The curvature imposed on the belt enables the external edge of the basket to be brought close to it at the moment at which it is emptied.

Moreover, the rotational means of the arms can be manipulated, for example, in order to decrease the rotational speed at the moment when the baskets are emptied, for example, between position 6'a and 6'''a.

The rollers 2 of belt 1 are mounted freely in rotation and are guided, for example, by their ends, into slides to traverse a closed trajectory of the trajectory type T represented in FIG. 3.

Each roller 2 is moreover driven rotationally by a series of driven rollers, such as rollers 7a-7g as represented in FIG. 2.

In FIG. 2, six rollers 2a-2f and seven driven rollers 7a-7g are represented.

The driven rollers are rotationally mounted as can be seen in FIG. 2, such that they turn successively one after another in one direction, and then the other.

Thus, and as an example, driven rollers 7b, 7d, 7f turn in a clockwise direction and driven rollers 7a, 7c, 7e and 7g turn in a counterclockwise direction (see arrows on the drawing).

Moreover, as can be seen from FIG. 2, the spacing of the driven rollers is smaller than that of the rollers.

In the example given, for a given length of belt, there is one more driven roller than there are rollers.

The rollers come in successive contact with each driven roller in such a way that they are driven alternately in one direction, and then in the other, thus favoring the passage of the chicks between the rollers.

Arrow F1 always represents the direction of movement of the belt.

In this way, rollers 2a, 2b and 2f are driven by contact with respective driven rollers 7a, 7b and 7g, whereas rollers 2c, 2d and 2e are driven by inertia, after their contact with respective driven rollers 7c, 7d and 7e.

In this way, it can be noted that the rollers of the roller pairs 2a, 2b and 2c, 2d turn in the opposite direction downwardly, favoring the passage of the chicks, the rollers of roller pairs 2b, 2c and 2d, 2e turn in the opposite direction upwardly, whereas the rollers of the roller pairs 2e, 2f turn in the same direction.

However, it is clear that these rotational directions are considered at a given moment, and that very shortly afterwards, these can change completely. Because there are a greater number of driven rollers, it is understood that in the given example, a small displacement of the belt will, at first, only modify the rotational direction of rollers 2e in such a way that it is the rollers of the pair 2d, 2e that turn in the same direction (inverse to the rotational direction of roller 2f).

In order to clean the rollers, the invention suggests a system notably comprising, on one portion of the path of the rollers: one rotating brush 8 that is dipped in a washing vat 9, filled, for example, with hot water, followed downstream, with respect to the direction of movement F1 of the belt, by three rotating brushes 10a, 10b and 10c, arranged in such a way that they hit against projections, in the shape of angles, respectively referenced 11a, 11b and 11c, during their rotation.

It is clear that brushes 8, 10a, 10b and 10c are arranged such that they rub against rollers 2 of belt 1. Moreover, it is also clear that the rotation of the brushes, as represented, is done in the opposite direction with respect to the direction of movement of the belt at the level of their points of contact with the rollers.

It is understood that brush 8 and vat 9 form a washing assembly, referenced by L, whereas brushes 10a, 10b and 10c and angular projections 11a, 11b and 11c form a wiping or drying assembly referenced by S.

The temperature of the liquid of the tank 9 favors the eventual drying of the rollers by brushes 10a, 10b and 10c that get drained on angular projections 11a, 11b and 11c.

Numerous variations can be envisioned, without leaving the scope of the invention.

For example, variations can include a single arm 3a or, on the contrary, more than two arms. There can also be provided several baskets 6a, 6b per arm.

Moreover, control means for controlling the cycle, and for the automation of the loading and/or unloading can also be provided.

It is clear also, that other means exist to cooperate with the present invention, such as, especially, a second recovery belt placed beneath belt 1; however, this, although necessary, is not a part of the invention strictly speaking, and is not represented.

This application corresponds to French Application No.9114894, filed Dec. 2, 1991, whose priority is claimed under 35 U.S.C. 119, and whose disclosure is incorporated by reference herein in its entirety.

We claim:

1. System for separating newly hatched chicks from hatching debris, comprising:
    at least one movable belt displaceable in a direction of displacement, said at least one movable belt including rollers arranged parallel with respect to one another, and perpendicularly with respect to the direction of displacement; and
    at least one support arm which is rotationally mounted above the belt about an axis substantially parallel to said rollers of said belt, said at least one support arm including means for maintaining at least one basket in which the chicks and the debris to be sorted are placed.

2. System according to claim 1, wherein said at least one support arm is capable of rotational movement in an opposite direction with respect to the direction of displacement of said at least one movable belt.

3. System according to claim 2, wherein said at least one support arm has a rotational axis and a length, and said at least one movable belt includes, just beneath said at least one support arm, a partially cylindrical concave trajectory surface whose axis of curvature is coaxial to the rotational axis of said at least one support arm, and is arranged above a general plane of said at least one movable belt at a distance smaller than the length of said at least one support arm, so that said partially cylindrical concave trajectory surface is substantially parallel and next to at least one of a surface described by an external edge of said at least one support arm and a surface described by a basket within said at least one support arm.

4. System according to claim 2, wherein said at least one support arm comprises at least two arms that are diametrically opposed and adapted to receive at least two baskets, so that one full basket can be loaded on one of said at least two arms on one side, and, at the same time, one empty basket can be unloaded from another of said at least two arms at another side.

5. System according to claim 3, wherein said at least one support arm comprises at least two arms that are diametrically opposed and adapted to receive at least two baskets, so that one full basket can be loaded on one of said at least two arms on one side, and, at the same time, one empty basket can be unloaded from another of said at least two arms at another side.

6. System according to claim 2, wherein the rotational speed of said at least one support arm is a function of position of said at least one support arm, the speed being reduced more at a moment when the baskets are emptied on said at least one movable belt.

7. System according to claim 5, wherein the rotational speed of said at least two arms is a function of position of said at least two arms, the speed being reduced more at a moment when the baskets are emptied on said at least one movable belt.

8. System according to claim 1, wherein said rollers of said at least one movable belt are mounted freely in rotation, and including a series of driven rollers positioned beneath at least one portion of said at least one movable belt so that each roller of said rollers of said least one movable belt, during its path, is temporarily driven in rotation by each driven roller of said series of driven rollers.

9. System according to claim 8, wherein spacing of driven rollers in said series of driven rollers is less than that of rollers of said at least one movable belt, so that for a given length of said at least one movable belt there are more driven rollers than rollers, whereby two successive rollers may turn, by contact or by inertia, in an inverse direction downwardly, or in an inverse direction upwardly, or, in the same direction.

10. System according to claim 8, wherein two successive driven rollers of said series of driven rollers are driven in inverse rotation, so that rollers of said at least one movable belt change their direction of rotation at each contact with a driven roller.

11. System according to claim 9, wherein two successive driven rollers of said series of driven rollers are driven in inverse rotation, so that rollers of said at least one movable belt change their direction of rotation at each contact with a driven roller.

12. System according to claim 6, wherein said rollers of said at least one movable belt are mounted freely in rotation, and including a series of driven rollers positioned beneath at least one portion of said at least one movable belt so that each roller of said rollers of said least one movable belt, during its path, is temporarily driven in rotation by each driven roller of said series of driven rollers.

13. System according to claim 12, wherein spacing of driven rollers in said series of driven rollers is less than that of rollers of said at least one movable belt, so that for a given length of said at least one movable belt there are more driven rollers than rollers, whereby two successive rollers may turn, by contact or by inertia, in an inverse direction downwardly, or in an inverse direction upwardly, or, in the same direction.

14. System according to claim 13, wherein two successive driven rollers of said series of driven rollers are driven in inverse rotation, so that rollers of said at least one movable belt change their direction of rotation at each contact with a driven roller.

15. System according to claim 1, wherein:
said at least one movable belt traverses a path forming a closed loop; and
a cleaning and drying device for said roller of said at least one movable belt is positioned at at least one portion of said path, said cleaning and drying device comprising:
  at least one rotating washing brush arranged to contact said rollers of said at least one movable belt, said at least rotating washing being combined with a washing vat capable of holding a heated liquid in which said at least one washing brush is dipped at least partially during its rotation; and
  at least one rotating drying or wiping brush arranged to contact said rollers of said at least one movable belt, said at least one rotating drying or wiping brush being combined with at least one drainage projection that said at least one rotating drying or wiping brush hits during rotation, said drying or wiping brush being positioned downstream from said at least one rotating washing brush with respect to the direction of displacement of said at least one movable belt.

16. System according to claim 15, wherein said at least one rotating washing brush and said at least one drying or wiping brush rotate in an opposite direction with respect to the direction of displacement of said at least one movable belt at a point of contact with said rollers.

17. System according to claim 6, wherein:
said at least one movable belt traverses a path forming a closed loop; and
a cleaning and drying device for said roller of said at least one movable belt is positioned at at least one portion of said path, said cleaning and drying device comprising:
  at least one rotating washing brush arranged to contact said rollers of said at least one movable belt, said at least rotating washing being combined with a washing vat capable of holding a heated liquid in which said at least one washing brush is dipped at least partially during its rotation; and
  at least one rotating drying or wiping brush arranged to contact said rollers of said at least one movable belt, said at least one rotating drying or wiping brush being combined with at least one drainage projection that said at least one rotating drying or wiping brush hits during rotation, said drying or wiping brush being positioned downstream from said at least one rotating washing brush with respect to the direction of displacement of said at least one movable belt.

18. System according to claim 17, wherein said at least one rotating washing brush and said at least one drying or wiping brush rotate in an opposite direction with respect to the direction of displacement of said at least one movable belt at a point of contact with said rollers.

19. System according to claim 8, wherein:
said at least one movable belt traverses a path forming a closed loop; and
a cleaning and drying device for said roller of said at least one movable belt is positioned at at least one portion of said path, said cleaning and drying device comprising:
  at least one rotating washing brush arranged to contact said rollers of said at least one movable belt, said at least rotating washing being combined with a washing vat capable of holding a heated liquid in which said at least one washing brush is dipped at least partially during its rotation; and
  at least one rotating drying or wiping brush arranged to contact said rollers of said at least one movable belt, said at least one rotating drying or wiping brush being combined with at least one drainage projection that said at least one rotating drying or wiping brush hits during rotation, said drying or wiping brush being positioned downstream from said at least one rotating washing brush with respect to the direction of displacement of said at least one movable belt.

20. System according to claim 19, wherein said at least one rotating washing brush and said at least one drying or wiping brush rotate in an opposite direction with respect to the direction of displacement of said at least one movable belt at a point of contact with said rollers.

* * * * *